(12) United States Patent
Kapicioglu et al.

(10) Patent No.: US 9,785,993 B2
(45) Date of Patent: *Oct. 10, 2017

(54) METHOD FOR ANALYZING AND RANKING VENUES

(71) Applicant: Verve Wireless, Inc., Carlsbad, CA (US)

(72) Inventors: Cagatay Berk Kapicioglu, New York, NY (US); David Rosenberg, New York, NY (US)

(73) Assignee: Verge Wireless, Inc., Carlsbad, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 13/668,602

(22) Filed: Nov. 5, 2012

(65) Prior Publication Data

US 2013/0325746 A1 Dec. 5, 2013

Related U.S. Application Data

(60) Provisional application No. 61/655,073, filed on Jun. 4, 2012.

(51) Int. Cl.
  *G06Q 30/06* (2012.01)
  *G06Q 30/02* (2012.01)
  *G06Q 50/00* (2012.01)
(52) U.S. Cl.
  CPC ..... *G06Q 30/0625* (2013.01); *G06Q 30/0631* (2013.01)

(58) Field of Classification Search
CPC combination set(s) only.
See application file for complete search history.

(56) References Cited

U.S. PATENT DOCUMENTS

| | | | |
|---|---|---|---|
| 8,200,247 B1 * | 6/2012 | Starenky | G01C 21/28 455/404.2 |
| 8,768,313 B2 | 7/2014 | Rodriguez | |
| 8,909,629 B2 | 12/2014 | Seth et al. | |
| 9,047,316 B2 | 6/2015 | Kapicioglu et al. | |

(Continued)

OTHER PUBLICATIONS

USPTO, Office Action for U.S Appl. No. 13/751,738, Jul. 31, 2014, 15 pgs., USA.

(Continued)

*Primary Examiner* — Mark A Fleischer (57) ABSTRACT

A technique is disclosed for ranking venues and for providing a user with one or more of the ranked venues. To do so, a data processing system trains a model during a first, training sequence, by using a training dataset of past check-ins that were made by users visiting venues. The trained model, representing a learned hypothesis, represents venues that are ranked according to their relevance to users who are also represented by the model. During a second, run-time sequence, the system receives real-time geolocation data that represents users and generates a set of candidate venues for a user by determining venues that are nearby the geolocation of the user. The system then ranks the generated candidate venues by applying the learned hypothesis. One or more of the ranked venues can be provided to a user's wireless terminal, for example, where they can be presented as venue recommendations.

17 Claims, 8 Drawing Sheets

(56) References Cited

U.S. PATENT DOCUMENTS

| | | | |
|---|---|---|---|
| 2010/0211308 A1* | 8/2010 | Zheng | G01C 21/20 |
| | | | 701/533 |
| 2011/0072034 A1 | 3/2011 | Sly et al. | |
| 2011/0276565 A1* | 11/2011 | Zheng | G01C 21/20 |
| | | | 707/724 |
| 2013/0046456 A1 | 2/2013 | Scofield et al. | |
| 2013/0073422 A1* | 3/2013 | Moore | G06Q 10/10 |
| | | | 705/26.7 |
| 2013/0073631 A1 | 3/2013 | Patton et al. | |
| 2013/0097246 A1 | 4/2013 | Zifroni et al. | |
| 2013/0203423 A1* | 8/2013 | Alles | G01S 1/022 |
| | | | 455/446 |
| 2013/0218683 A1 | 8/2013 | Hannan | |
| 2013/0226857 A1 | 8/2013 | Shim et al. | |
| 2013/0267252 A1 | 10/2013 | Rosenberg | |
| 2013/0317944 A1 | 11/2013 | Huang et al. | |

OTHER PUBLICATIONS

USPTO, Notice of Allowance for U.S. Appl. No. 13/751,738, Jan. 20, 2015, 14 pgs., USA.

United States Patent and Trademark Office, Office Action for U.S. Appl. No. 14/716,807, May 19, 2016, 25 pages, U.S.A.

\* cited by examiner

METHOD FOR ANALYZING AND RANKING VENUES

CROSS REFERENCE TO RELATED APPLICATIONS

The underlying concepts, but not necessarily the language, of the following application are incorporated herein by reference:

(1) U.S. Provisional Patent Application No. 61/655,073, filed on 4 Jun. 2012. If there are any contradictions or inconsistencies in language between this case and the applications that has been incorporated by reference that might affect the interpretation of the claims in this case, the claims in this case should be interpreted to be consistent with the language in this case.

FIELD OF THE INVENTION

The present invention relates to sensor analytics in general, and, more particularly, to analyzing and ranking venues that can be visited by a user.

BACKGROUND OF THE INVENTION

Global positioning system (GPS) and other position determining systems are enabled in a wide variety of devices, including mobile phones, personal navigation devices, and automobiles. The proliferation of such enabled devices has resulted in an enormous amount of location data being generated. The location data generated typically consists of a latitude, a longitude, a unique identifier and, in some cases, metadata. The assessed location, or "geolocation," provided by the position determining systems can be used to deliver location-based services to a user.

Another factor that has contributed to a significant increase in location data generated has been the advent of location-based social networks such as Foursquare, Google Latitude, and Facebook Places. These web-based services enable users to share their location via a "check-in," which is a virtual announcement that informs the user's social network that the user is visiting a physical venue.

Figure 1:
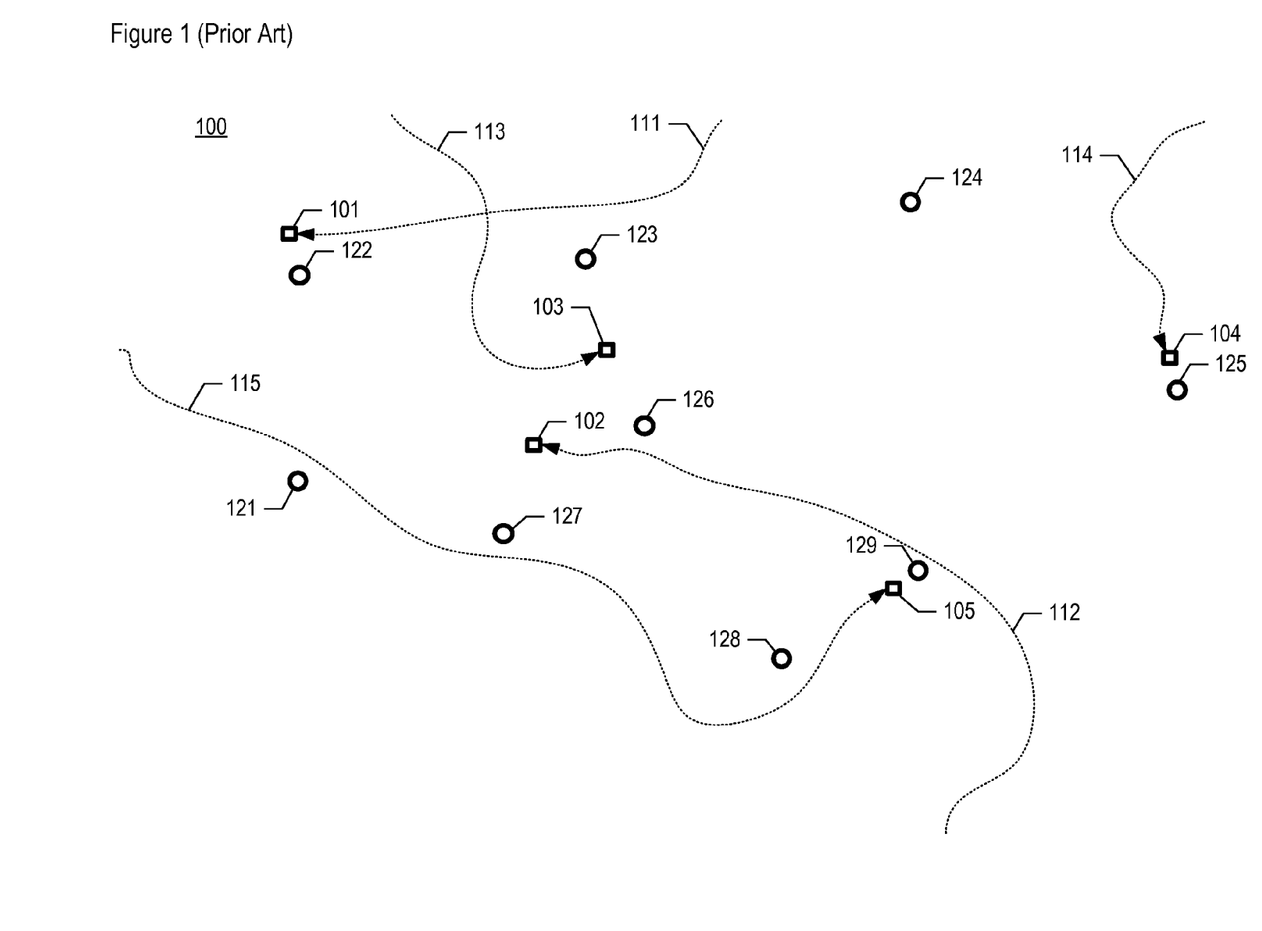
FIG. 1 depicts geographic area 100 in the prior art.

FIG. 1 depicts geographic area 100 in the prior art and shows users 101 through 105. Also depicted are the locations of venues 121 through 129. Users 101 through 105 can be seen traveling throughout area 100 and exhibit paths 111 through 115, respectively. As each user arrives at a venue, he might choose to send a check-in, in order to identify explicitly that he is visiting the venue. A check-in typically is made up of a collection of texts, such as "Celebrating Bob's birthday at Comedy Cellar!!," and photos that capture the user's activity at the venue of the check-in.

A user might choose to check-in at some venues that he physically visits, but not at others. For example, user 105 might have checked in at venues 127 and 129, but not at venues 121 and 128, even though the user was present at all four venues. Similarly, user 104 might not check in at venue 125, even though user 104 was present at that venue.

From a data processing perspective, a check-in also includes structured data such as a venue identifier, a user identifier, and the local time. This data, in combination with the location data already described, enable additional location-based services to be provided to users.

SUMMARY OF THE INVENTION

The present invention enables the construction and use of a technique that is able to analyze and rank venues, and to present one or more of those venues to a user. In accordance with the illustrative embodiment of the present invention, a data-processing system trains a model by using a training dataset of past check-ins. The trained model, representing a learned hypothesis, ranks venues according to their relevance to one or more users. Applying the learned hypothesis to newly received, spatial-temporal data from one or more users, the data-processing system ranks candidate venues, and the ranked results can then be presented to the user.

In training the model, the data-processing system of the illustrative embodiment uses training data that include, for example and without limitation, user identifiers, venue identifiers of those venues checked into in the past by the users, time and data of the check-ins, and locations of venues checked into. From this data, the system determines additional candidate venues in relation to the location of each checked-into venue. From the combination of users and venues, both checked-into and candidate, the system of the illustrative embodiment then learns a hypothesis, as part of the trained model.

The data-processing system of the illustrative embodiment ranks new venues—in other words, venues that have not been previously visited by the user. By ranking and then presenting only the candidate venues that are new, the data-processing system promotes venue discovery on the part of the user. In some alternative embodiments of the present invention, however, at least some venues that have been already visited by the user are also ranked and presented to the user.

In ranking new venues, the data-processing system of the illustrative embodiment uses current data that include, for example and without limitation, user identifiers, the assessed locations (i.e., "geolocations") of the users at their wireless terminals (e.g. cell phones, etc.), and the calendrical times that correspond to the identified users being at the determined locations. From this data, the system determines candidate venues in relation to the geolocation of each user. The system of the illustrative embodiment ranks the candidate venues and then presents one or more of the ranked venues to a user.

The system of the illustrative embodiment disclosed herein comprises features that distinguish it from at least some systems in the prior art. The disclosed system provides a relative ranking of candidate venues for a particular user, in contrast to providing a rating. The ranking of the venues is based on both the particular user's past check-ins, as well as the past check-ins of other users.

The disclosed system also provides a ranking that is local, among those candidate venues that are nearby a recent geolocation of the user. This is in contrast to providing a global ranking (or rating, for that matter) across all venues known throughout the dataset. Advantageously, this relaxation from global to local enables the system to utilize objective functions that focus exclusively on distinguishing between neighboring venues (e.g., a sandwich shop, the bagel shop two doors down, the breakfast place across the street, etc.), where the relative order in a ranking matters, and not between distant venues (e.g., a bagel shop in New York City, a bagel shop in Los Angeles, etc.).

The disclosed system, in some embodiments, utilizes a spatial feedback in which if a first user checked into a first venue, but not to nearby second venue, then it is assumed that the first user preferred the first venue to the second venue. Advantageously, this enables the disclosed system to train a model with which to sufficiently rank candidate venues for one or more additional users, and also obviates the need to receive negative "examples" in a system that is designed to receive and process venue check-ins, which are positive examples.

The disclosed system, in some embodiments, presents only the highest-ranked venue to the user. This is particularly advantageous in accommodating wireless terminal displays, such as smart-phone displays having space constraints.

In some embodiments, ranking provided by the disclosed system is based on one or more contexts such as time (e.g., morning, evening, weekday, weekend, etc.), venue characteristics (e.g., restaurant, dry cleaner, clothing store, etc.), user characteristics (e.g., commuter, college student, soccer mom, etc.), and so on. As a result, the disclosed system is able to customize the ranking so that a user, for example, receives a ranking of one or more lunch restaurants during the late-morning hours and a ranking of one or more bars during the evening hours.

Although the illustrative embodiment of the present invention is directed at providing one or more venue recommendations in response to receiving a user's geolocation, it will be clear to those skilled in the art, after reading this specification, how to make and use embodiments of the present invention in which a ranking of venues is provided for other purposes. For example and without limitation, the disclosed system can be used to generate a ranking for the purpose of predicting a venue that a user is at presently or will be at in the future.

An illustrative embodiment of the present invention comprises: receiving, by a data-processing system, a geolocation of a first user; generating, by the data-processing system, a non-empty set of candidate venues based on the geolocation of the first user; and ranking the candidate venues, by the data-processing system, based on applying a hypothesis that is learned from locations of one or more venues visited by at least one of i) the first user and ii) one or more additional users, wherein the hypothesis incorporates a rule of preferring a visited venue to a non-visited venue.

DETAILED DESCRIPTION

The following terms are defined for use in this Specification, including the appended claims:

The term "location" is defined as a zero-dimensional point, a finite one-dimensional path segment, a finite two-dimensional surface area, or a finite three-dimensional volume.

The term "venue," and its inflected forms, is defined as a place that can be visited by one or more users. A user might choose to identify explicitly that he is visiting a particular venue by sending a "check-in."

The term "calendrical time T" is defined as the time as denominated in one or more measures (e.g., seconds, minutes, hours, time of day, day, day of week, month, month of year, year, etc.).

The term "wireless terminal" is defined as a wireless telecommunications terminal that is capable of transmitting and/or receiving communications wirelessly. As is well known to those skilled in the art, a wireless terminal is also commonly referred to by a variety of alternative names such as a wireless transmit/receive unit (WTRU), a user equipment (UE), a mobile station, a fixed or mobile subscriber unit, a pager, a cellular telephone, a personal digital assistant (PDA), a computer, or any other type of device capable of operating in a wireless environment. A wireless terminal can be used by its user to send a "check-in" at a venue, and can be used to present information to its user, among its other functions.

The term "spatial-temporal (S-T) event," or "event," and its inflected forms, is defined as any activity or occurrence that can be identified by the location and/or time at which it occurs. For example and without limitation, a spatial-temporal event can represent the arrival or departure of a person(s), animal(s), or product(s) to and/or from a specific geographic location such as, but not limited to, a place of employment, a transit terminal, a food store, a landmark, a shopping center, a hospital, a residence, a street, town, city, state, country, or any location determined by a global positioning system (GPS)-enabled device or assessed by other position determining equipment. A user checking in at a venue is an example of an S-T event.

The term "spatial-temporal (S-T) data point," or "data point," and its inflected forms, is defined as data or other information that identifies a specific event, user, or device at a specific location and/or time. For example and without limitation, a spatial-temporal data point can include: a time stamp along with a corresponding geographic location, such as, the time at a latitude and longitude; a time stamp along with an indicium of a specific event at a fixed geographic location, such as the time of a special or sale at a store or entertainment venue; measurement uncertainty information, such as the accuracy of the position determination; the occurrence of an event or action at a particular time and location, such as a taxi being full in the warehouse district at 2:00 am, texting occurring, tweeting occurring, etc.; details about a user communication, such as a Short Message Service (SMS) text having been sent; details about a visited venue, such as type of venue (e.g., bar, restaurant, etc.); or other supplemental information. Data points originate from various data sources that include, while not being limited to, a location enabled device such as a wireless terminal, a GPS enabled device, a networked device, a WiFi enabled device, a radio-frequency identification (RFID)-enabled device, and an automated teller machine (ATM) machine. A data point can represent a visit by a user to a determinable location or at a determinable time, or both, wherein the location and/or time can be determined from the contents of the data point or through other means. The information that constitutes a "check-in" sent by a user is conveyed by one or more data points.

Figure 2:
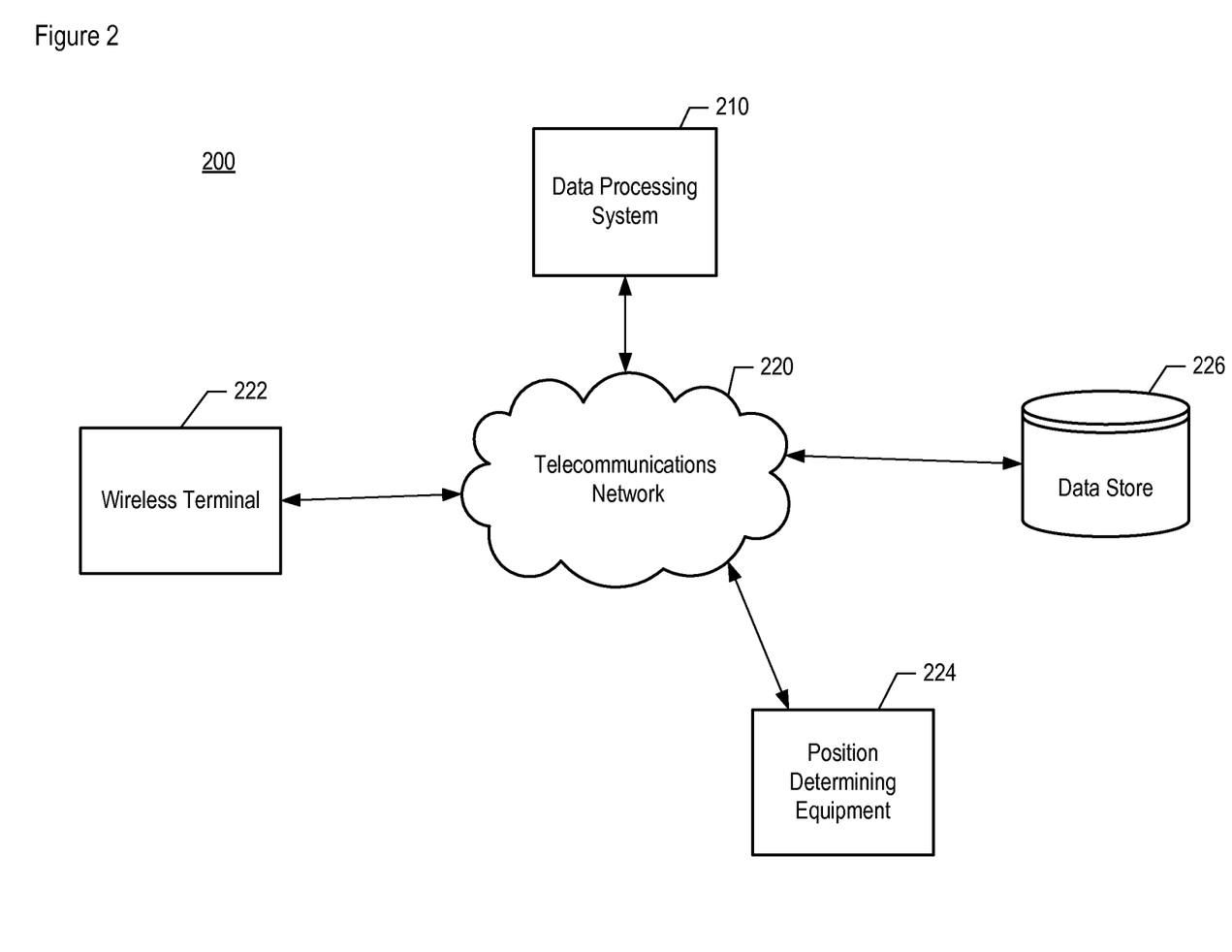
FIG. 2 depicts a block diagram of the salient components of sensor analytics system 200, in accordance with the illustrative embodiment of the present invention.

FIG. 2 depicts a block diagram of the salient components of sensor analytics system 200, in accordance with the illustrative embodiment of the present invention. FIG. 2 depicts data-processing system 210; telecommunications network 220; wireless terminal 222; position determining equipment (PDE) 224; and data store 226. The components depicted in FIG. 2 are interconnected as shown.

As those who are skilled in the art will appreciate, after reading this disclosure, sensor analytics system 200 can comprise additional components that also provide sources and repositories of data, in some embodiments of the present invention. Furthermore, in addition to the components depicted in FIG. 2, sensor analytics system 200 can also be connected to external components that provide additional sources and repositories of data, in some embodiments of the present invention.

Data-processing system 210 is a computer that comprises non-transitory memory, processing component(s), and communication component(s), as described in more detail in FIG. 2. Data-processing system 210 executes and coordinates the salient tasks of sensor analytics system 200 according to the illustrative embodiment of the present invention. For example, data-processing system 210 receives, via network 220, spatial and/or temporal data from one or more of the data sources, as described in detail below. Data-processing system 210 then analyzes the received data as described below and with respect to the tasks described in FIGS. 4 through 8. System 210 is able to send the results of the analysis to user devices (e.g., terminal 222, etc.) for presentation and/or store the results in data store 226 or elsewhere.

Telecommunications network 220 comprises a collection of links and nodes that enable telecommunication between devices, in well-known fashion. Telecommunications network 220 provides sensor analytics system 200 with connectivity to other systems that enable sensor analytics system 200 to retrieve data and also to transmit, store, and archive data as needed. In some embodiments of the present invention, telecommunications network 220 is the Public Switched Telephone Network (PSTN); in some embodiments of the present invention, network 220 is the Internet; in some embodiments of the present invention, network 220 is a private data network. It will be clear to those with ordinary skill in the art, after reading this disclosure, that in some embodiments of the present invention network 220 can comprise one or more of the above-mentioned networks and/or other telecommunications networks, without limitation. Furthermore, it will be clear to those will ordinary skill in the art, after reading this disclosure, that telecommunications network 220 can comprise elements that are capable of wired and/or wireless communication, without limitation.

Wireless terminal 222 is a user device within sensor analytics system 200. Terminal 222 comprises the hardware and software necessary to exchange information with other wireless terminals and other elements depicted in FIG. 2, in well-known fashion. Terminal 222 also comprises the hardware and software necessary to perform the actions described below and in the accompanying figures. For example and without limitation, wireless terminal 222 is capable of:

i. generating spatial-temporal data, and transmitting some or all of that data to one or more other devices in system 200, and ii. receiving venue-related data and other data from data processing system 210, and presenting some or all of that data to its user, such as on a display.

In accordance with the illustrative embodiment of the present invention, wireless terminal 222 is global positioning system (GPS)-enabled and, accordingly, is capable of determining and reporting its own geolocation, which is also representative of the geolocation of the terminal's user. As those who are skilled in the art will appreciate, however, another element that is part of sensor analytics system 200 can determine and report the location of terminal 222, such as position determining equipment 224.

Although sensor analytics system 200 as depicted in FIG. 2 comprises only one wireless terminal, it will be clear to those skilled in the art, after reading this disclosure, how to make and use alternative embodiments of the present invention that comprise any number of wireless terminals.

Position determining equipment (PDE) 224 is capable of determining the location of user devices such as wireless terminal 222, in well-known fashion. PDE 224 is also capable of providing the assessed geolocation of a device (and, by extension, of the device's user), with or without a timestamp, to data-processing system 210. PDE 224 is further capable of providing an indication of a spatial and/or temporal event occurring at a measured user device.

Data store 226 an electronic data storage device capable of providing data related to spatial and/or temporal events. The data provided by data store 226 may have originated from other sources of data, such as terminal 222 or PDE 224. Data store 226 comprises non-transitory memory (e.g., a hard disk, etc.) that is used by sensor analytics system 200 to store, archive, and retrieve information, in well-known fashion.

The data points provided to data-processing system 210 from the aforementioned devices can include information relating to and/or identifying one or more particular events, users, or devices at a certain location and/or time. In accordance with the illustrative embodiment of the present invention, system 210 receives data points that convey information sent as part of check-ins made by users who are identifying their presence at venues they are visiting.

In some embodiments of the present invention, the data points received by data-processing system 210 can include data provided from a wireless network-based communication device such as terminal 222. Such data may include, but is not limited to, i) the location of a particular cell phone within a cellular network at a particular time and/or ii) the GPS location and time data. Alternatively, or in addition, the data may include user information, such as a user identifier (ID) or an account ID associated with a particular device. The data originating at a communication device can be passed directly from the device or indirectly through another device such as PDE 224 or data store 226. Moreover, the data can include information that relates to the user device from which it is being provided, such as whether the device is a cell phone, laptop, personal digital assistant or GPS-enabled device.

The data points may be provided to data-processing system 210 in real-time as an event or activity occurs, such as a check-in sent from wireless terminal 222. Alternatively, or in addition, data may be provided from a data provider or data aggregator. The data provider or data collector can collect the data points over a specified period prior to sending them to data-processing system 210. The stored data then may be provided to data-processing system 210 periodically or sporadically according to a predetermined schedule or at user-specified times.

In some embodiments of the present invention, the data provided to data-processing system 210 includes metadata about venues (e.g., type of venue, etc.) and users (e.g., birth date, gender, etc.), and additional demographic and/or commercial information, for example and without limitation. Such information can be of a general nature or can be specifically associated with the locations and/or times of one or more events and/or activities.

In some embodiments of the present invention, data-processing system 210, in order to perform some of its functions, also communicates, coordinates, and electronically with systems outside of sensor analytics system 200.

It will be clear to those skilled in the art, after reading the present disclosure, that the system illustrated in FIG. 2 can be embodied in different variations that are consistent with the present invention. For example, in some embodiments of the present invention, sensor analytics system 200 comprises displays other than, or in addition to, the display that is part of wireless terminal 222. For example, in some embodiments of the present invention, data store 226 comprises a plurality of data stores or a plurality of data storage technologies (e.g., a cloud-based storage system, etc.). For example, in some embodiments of the present invention, not all depicted components are on-site. For example, in some embodiments of the present invention, the depicted components are interconnected indirectly (e.g., through servers, gateways, switches, networks, the Internet, etc.). In any event, it will be clear to those skilled in the art, after reading the present disclosure, how to make and use sensor analytics system 200.

Figure 3:
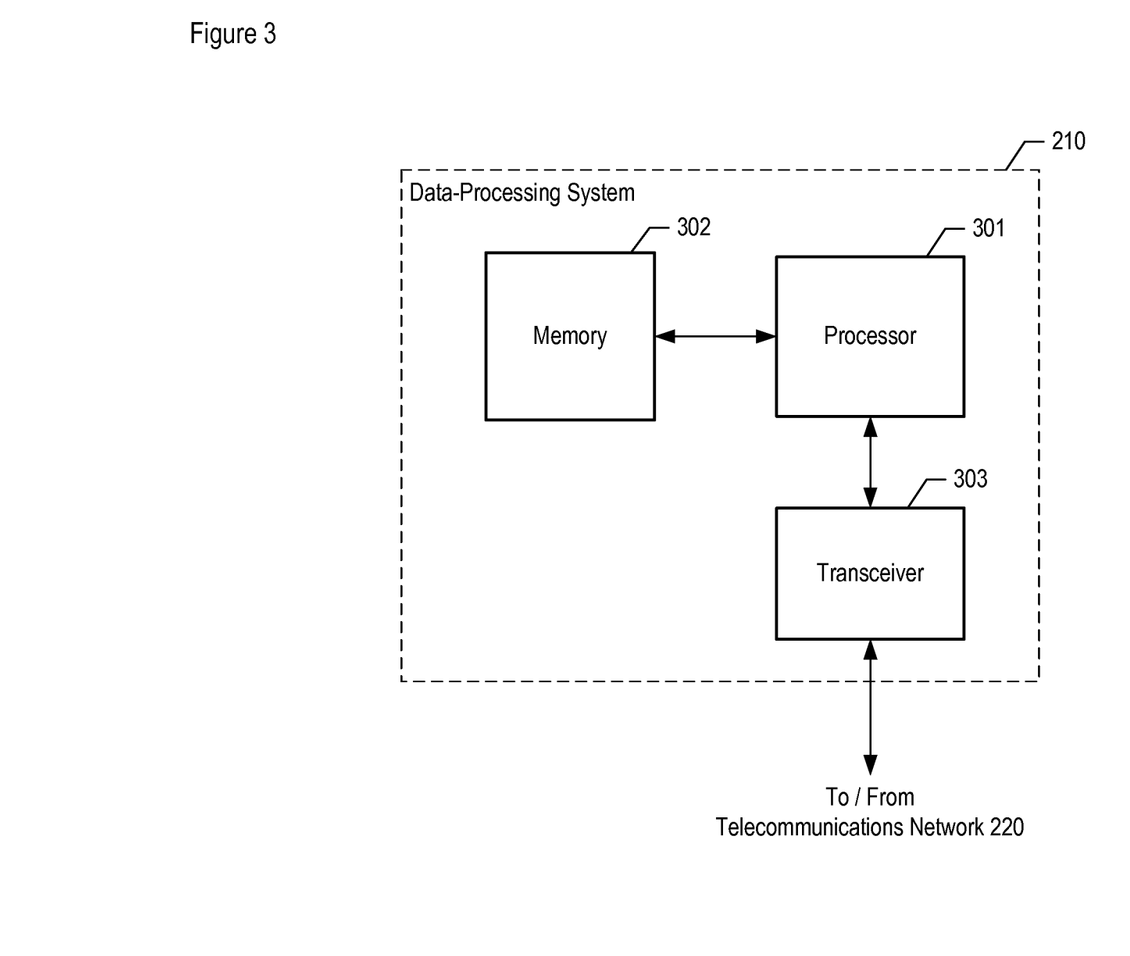
FIG. 3 depicts a block diagram comprising the salient elements of data-processing system 210, in accordance with the illustrative embodiment of the present invention.

FIG. 3 depicts a block diagram comprising the salient elements of data-processing system 210, in accordance with the illustrative embodiment of the present invention. Data-processing system 210 comprises: processor 301; memory 302; transceiver 303; and a communication path to telecommunications network 220, interconnected as shown.

Processor 301 is a processing device such as a microprocessor that, in conjunction with the other components in data-processing system 210, is capable of executing the software and processing the data according to the tasks described herein. Processor 301 processes data points and other data received via transceiver 303. Processor 301 is well known in the art.

Memory 302 is non-transitory memory that stores program code and data sufficient to enable the execution of software and data processing according to the tasks described herein. Memory 302 is well known in the art.

Transceiver 303 is a component that enables data-processing system 210 to communicate electronically, whether in a wired or wireless configuration, with other components internal and external to sensor analytics system 200, including i) receiving data from telecommunications network 220, such as data originating at the individual devices connected to network 220, and ii) transmitting data to devices connected to network 220, such as presentation data that is intended for wireless terminal 222. Transceiver 303 is well known in the art.

It will be clear to those skilled in the art, after reading the present disclosure, that data-processing system 210 can be embodied in a different configuration than that depicted, as a multi-processor platform, as a server (e.g., application server, etc.), as a sub-component of a larger computing platform, or in some other computing environment—all within the scope of the present invention. It will be clear to those skilled in the art, after reading the present disclosure, how to make and use data-processing system 210.

FIGS. 4 through 8 depict flowcharts and related examples of the salient tasks performed by data-processing system 210, in accordance with the illustrative embodiment of the present invention. The operations performed by system 210 are depicted in the drawings in a particular order and are sequential. It will, however, be clear to those skilled in the art after reading this disclosure that these operations can be performed in a different order from that depicted or can be performed in a non-sequential order, in some alternative embodiments. For example, in some alterative embodiments, system 210 can perform at least some of the described tasks by using multitasking and/or parallel processing. At least some of the depicted tasks can be combined, performed in a different order, performed by different devices, or omitted, in some alternative embodiments of the present invention.

Moreover, the separation of various components in the illustrative embodiment described herein should not be understood as requiring such separation in all embodiments of the present invention. Furthermore, it will be clear to those skilled in the art, after reading this disclosure, that the described program components and systems can generally be integrated together in a single software product or arranged into multiple software products.

For pedagogical purposes, the tasks depicted in the flowcharts herein are presented from the perspective of applying to a single user. It will, however, be clear to those skilled in the art, after reading this disclosure, that the performed operations can be applied to multiple users, either concurrently and/or sequentially. Furthermore, the depicted tasks can be repeated, either periodically and/or sporadically, for example in order to update the information that is processed for one or more users.

Figure 4:
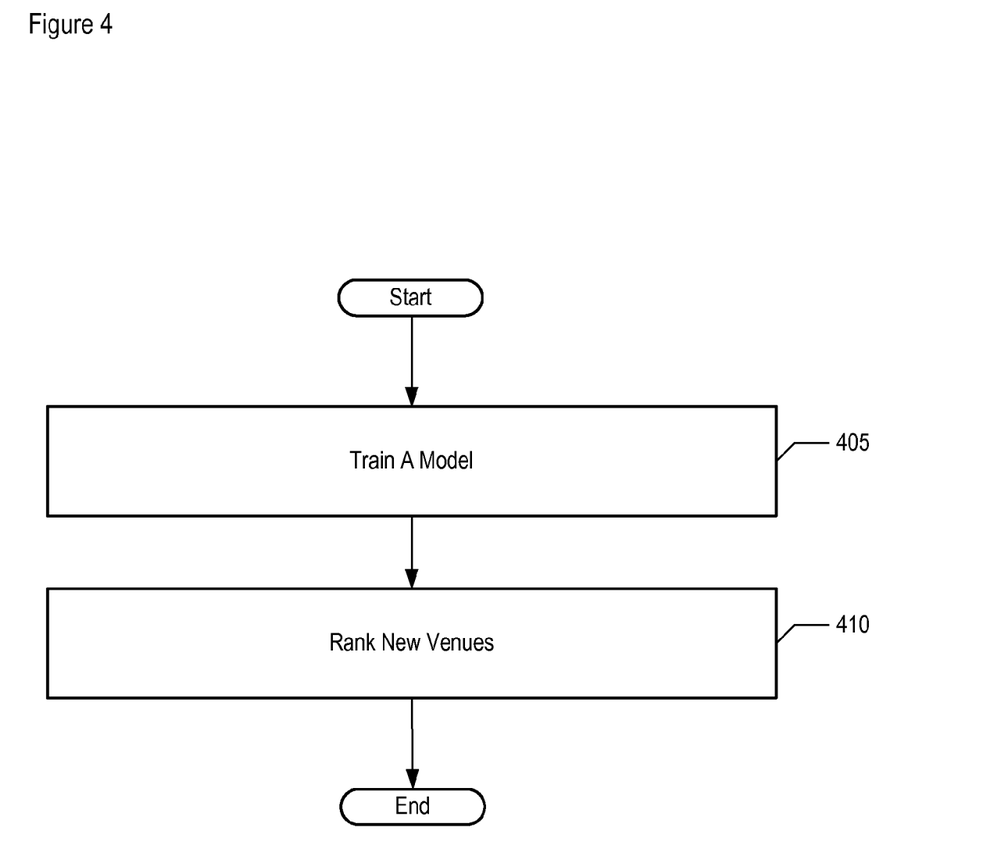
FIG. 4 depicts a flowchart of the salient tasks performed by data-processing system 210, in accordance with the illustrative embodiment of the present invention.

FIG. 4 depicts a flowchart of the salient tasks performed by data-processing system 210, as shown in FIG. 3, in accordance with the illustrative embodiment of the present invention.

At task 405, data-processing system 210 trains a model by using a training dataset of past check-ins. The trained model ranks venues according to their relevance to one or more users, and represents a learned hypothesis. Task 405 is described in detail below and with respect to FIG. 5.

At task 410, data-processing system 210 ranks new venues, by applying the learned hypothesis (i.e., represented by the trained model) to newly received spatial-temporal data that corresponds to one or more users. Task 410 is described below and with respect to FIG. 6.

As those who are skilled in the art will appreciate, after reading this specification, some or all of the subtasks that constitute task 405 and/or task 410 may be repeated, either sporadically or periodically. For example, as new venues open for business, or go out of business, the training dataset changes, thereby requiring the model to be retrained at task 405. As another example, a particular user might send check-ins corresponding to multiple venues visited throughout a day, thereby requiring re-rankings of candidate venues, even for particular user, at task 410. Re-rankings due to additional check-ins can also require the model to be retrained at task 405.

Figure 5:
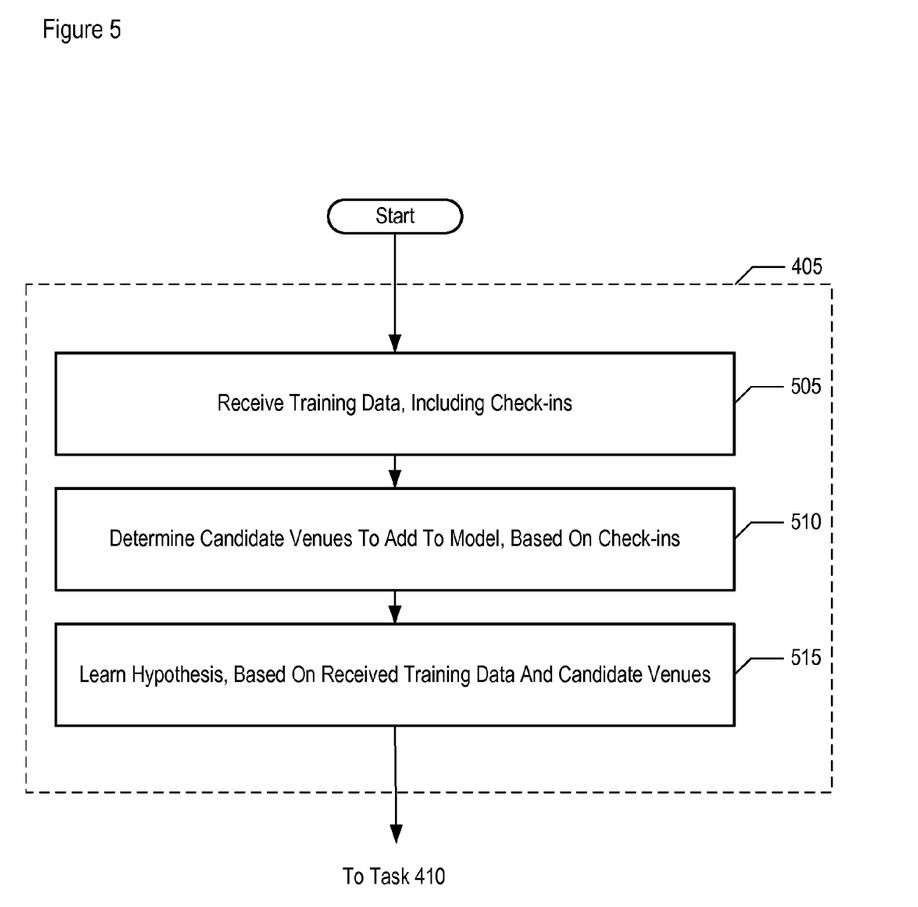
FIG. 5 depicts a flowchart of the salient subtasks of task 405.

FIG. 5 depicts a flowchart of the salient subtasks of task 405, in accordance with the illustrative embodiment of the present invention.

At task 505, data-processing system 210 receives training data that represents past check-in events. In accordance with the illustrative embodiment, the training data comprises one or more of the following elements, for example and without limitation, for past check-ins:
  i. a user identifier of each user who checked in,
  ii. a venue identifier of each venue at which a check-in occurred,
  iii. the calendrical time of the check-in,
  iv. the location of each venue at which a check-in occurred (e.g., geographic coordinates, etc.),
  v. additional user characteristics for each user who checked in (e.g., age, gender, interests, etc.),
  vi. additional venue characteristics for one or more venues included in the training data (e.g., type of venue, commercial codes, etc.), and
  vii. one or more criteria to determine proximity of a candidate venue to a visited venue (e.g., radius, shape of area of proximity, etc.).

At task 510, data-processing system 210 determines candidate venues to add to the model. For each venue at which a user has checked-in, system 210 identifies candidates venues in relation to the checked-into venue by identifying other venues that are nearby the checked-into venue. In accordance with the illustrative embodiment, system 210 identifies candidate venues as those venues within a predetermined distance (e.g., represented by radius, etc.) of the location of the checked-into venue, for all checked-into venues that are present in the training data. In order to find the venues that are within the predetermined distance, system 210 uses a search technique, such as a kd-tree search technique, as those who are skilled in the art will appreciate after reading this specification. In accordance with the illustrative embodiment, system 210 pares down the set of identified candidate venues by ignoring those venues that have been checked-into previously by a user.

In some alternative embodiments of the present invention, system 210 infers the venue at which the user checked-in, rather than using the venue identifier, for one or more of the checked-into venues in the received training data. System 210 does so by receiving the geolocation of the user where the check-in occurred and determines, from a database, what the closest venue or venues are to the user geolocation. From this determination, system 210 estimates the venue that the user must have been checking into. Then, from each estimated venue, system 210 generates the set of candidate venues in the manner already described.

At task 515, data-processing system 210 learns a hypothesis, based on the user data and venue data for visited and candidate venues. For pedagogical purposes, the check-in data can be represented as matrix $\hat{M}$, an m-by-n matrix, where m is the number of users and n is the number of venues. $\hat{M}$ is assumed to be a partially observed version of unknown matrix M, also an m-by-n matrix, where $M_{i,j}=1$ if user i likes a venue j and $M_{i,j}=-1$ otherwise. Although a binary representation is used for clarity purposes, the details disclosed herein can be generalized to count-based representations as well.

The partially-observed matrix $\hat{M}$ is affected by a lack of negative examples, in that if a check-in $\hat{M}_{i,j}$ has been observed, then user i likes venue j, but if a check-in has not been observed, then it is unknown as to whether the user likes that venue or not, as the user might not have had the opportunity to visit the venue. Therefore, and in accordance with the illustrative embodiment, system 210 imposes a spatial feedback, in order to account for that fact that users have not visited all venues on which the hypothesis is based. In particular, if user i has checked into venue j, but not to a nearby venue k, system 210 imposes the constraint that user i prefers venue j over venue k. In other words, a visited venue will rank higher than all of the other nearby venues, in learning the hypothesis. As those who are skilled in the art will appreciate, however, after reading this specification, the foregoing constraint can be softened or ignored entirely.

In accordance with the illustrative embodiment, data-processing system 210 approximates the unknown matrix M with a hypothesis matrix X, such that the maximum number of feedback-induced preferences is realized. Within this framework, a rank margin matrix factorization (RMMF) loss is defined as follows:

$$L_{RMMF}(X, \hat{M}) = \frac{1}{|E|} \sum_{(i,j,k) \in E} h(X_{i,j} - X_{i,k}) \qquad (1)$$

wherein X denotes the hypothesis matrix; the function h is the hinge loss function; and $E=\{(i,j,k)|(i,j) \in \Omega, k \in N(j)\}$ is the set of index tuples that represents the users' venue preferences, in which $(i,j,k) \in E$ if and only if user i prefers venue j over venue k, $\Omega$ denotes the set of observed indices of $\hat{M}$, and $N(j)$ is the indices of venues that are in the candidate set of j.

As a matter of practicality, equation (1) is regarded as an upper bound to the following expression:

$$\frac{1}{|E|} \sum_{(i,j,k) \in E} [[X_{i,k} \geq X_{i,j}]] \qquad (2)$$

wherein $[[\cdot]]$ denotes an indicator function whose value is 1 if its argument is true and 0 otherwise. As a result, equation (1) is a convex upper bound to the loss associated with the fraction of preference misorderings, the number of which to be minimized by minimizing the RMMF loss.

In order to control the complexity of the hypothesis space, for the purpose of preventing overfitting, system 210 enforces X to have both a low rank and a low Frobenius norm. The RMMF objective to be minimized is defined as follows:

$$J(U, V) = \frac{\lambda}{2}(\|U\|_F^2 + \|V\|_F^2) + \frac{1}{|E|} \sum_{(i,j,k) \in E} h((UV^T)_{i,j} - (UV^T)_{i,k}) \qquad (3)$$

wherein $\|\cdot\|_F$ denotes the Frobenius norm; an upper bound is applied to the rank of X; $U \in R^{m \times r}$ and $V \in R^{n \times r}$ are the factor matrices, in which $X=UV^T$; and $\lambda$ is a regularization parameter.

Equation (3) is extended to contextual features in the following equation:

$$K(U, V, w) = \frac{\lambda}{2}(\|U\|_F^2 + \|V\|_F^2) + \frac{\gamma}{2}\|w\|^2 + \qquad (4)$$
$$\frac{1}{|E|} \sum_{(i,j,k) \in E} h((UV^T)_{i,j} - (UV^T)_{i,k} + w^T(F_{i,j,\tau(i,j)} - F_{i,k,\tau(i,j)}))$$

wherein $F_{i,j,t} \in R^q$ denotes the feature vector corresponding to user i, venue j, and local time t; $\tau(i,j)$ denotes the local time at which user i checks into venue j; and $w \in R^q$ denotes the coefficients associated with the features; and $\lambda$ and $\gamma$ are regularization parameters.

Equation (4) accounts for the contextual feature of time-of-day. As those who are skilled in the art will appreciate after reading this specification, equation (4) can be derived to consider additional or other contextual features such as, but not limited to, type of venue, user gender, user birth date, and other venue and/or user features.

Various algorithms can be used to optimize the objectives represented by (3) and (4) above, such as the Pegasos and L-BFGS algorithms, for example and without limitation.

Referring again to FIG. 5, the learned hypothesis is then made available to the processing associated with task 410.

Figure 6:
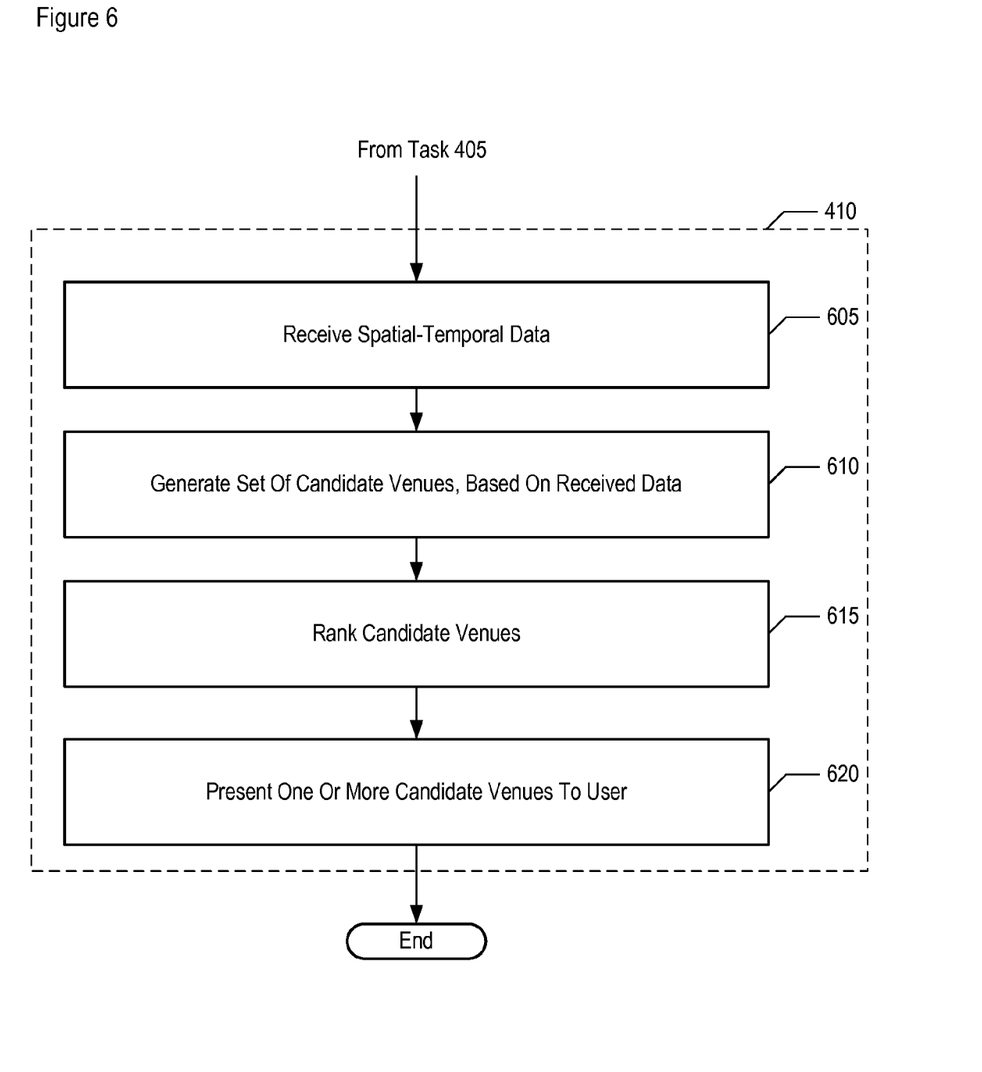
FIG. 6 depicts a flowchart of the salient subtasks of task 410.

FIG. 6 depicts a flowchart of the salient subtasks of task 410, in accordance with the illustrative embodiment of the present invention.

At task 605, data-processing system 210 receives spatial-temporal data that represents current activity on the part of a user, along with other user-related data. In accordance with the illustrative embodiment, the received data comprises one or more of the following elements, for example and without limitation:
  i. a user identifier of a user,
  ii. the geolocation of the user,
  iii. the calendrical time corresponding to when the user was at the location,
  iv. additional user characteristics for the user (e.g., age, gender, interests, etc.),
  v. one or more criteria to determine proximity of a candidate venue to the location of the user (e.g., radius, shape of area of proximity, etc.).

The assessed location, or "geolocation," of the wireless terminal 222, is used to represent the geolocation of the terminal's user. The geolocation is expressed in terms of latitude and longitude, as part of a geographic coordinate system. As those who are skilled in the art will appreciate, after reading this specification, a different coordinate system can be used such as the following, for example and without limitation: i) Cartesian, ii) Polar, iii) cylindrical, iv) spherical, v) homogeneous, vi) based on latitude and longitude, or vii) representative of a location with respect to one or more geographic features or landmarks (e.g., cities, bodies of water, highways, monuments, buildings, bridges, other structures, etc.).

The geolocations of a particular user are derived from the geolocations of a single wireless terminal, in the illustrative embodiment of the present invention. However, it will be clear to those skilled in the art, after reading this specification, how to make and use embodiments of the present invention in which the geolocations of a particular user can be derived from those of a first wireless terminal during a first period of time, a second wireless terminal during a second period of time, and so on. For example, a user might use multiple cell phones (one for work, one for personal use, etc.) or might have replaced a previous cell phone with a new cell phone.

At task 610, data-processing system 210 generates a set of candidate venues in relation to the geolocation of the user. System 210 determines candidate venues by identifying venues that are nearby the user's geolocation. In accordance with the illustrative embodiment, system 210 identifies candidate venues as those venues within a specified distance (e.g., radius, etc.) of the geolocation of the user. In some embodiments, system 210 receives a user-specified search radius and then applies that radius to the ranking process. In some other embodiments, system 210 uses a radius that is specified by a source other than a user (e.g., technician, machine, etc.).

In some embodiments of the present invention, system 210 uses the calendrical time corresponding to the geolocation of the user, in the data received at task 605, in order to generate the set of candidate venues in a time context. For example, it might be appropriate to include or exclude one or more categories of venues during lunchtime (e.g., include sandwich shops and dry cleaners, exclude dance clubs, etc.), whereas it would make sense to include or exclude a different set of categories late in the evening (e.g., include singles bars and all-night diners, exclude breakfast buffets and craft stores, etc.).

System 210, in some embodiments of the present invention, uses the calendrical time that corresponds to a user being at a geolocation, for generating the set of candidate venues, by basing the predetermined distance that is used to define "nearby" venues on the calendrical time.

In some embodiments of the present invention, system 210 uses a user's prior commercial exposure to one or more commercial categories, in order to generate the set of candidate venues. For example and without limitation, in generating the set of candidate venues, system 210 can track a user as having been exposed to one or more of the following commercial categories:
  i. One or more of J North American Industry Classification System (NAICS) codes;
  ii. One or more of K restaurant types;
  iii. One or more of L cuisine types; and
  iv. One or more of M top retail chains (e.g., Circle K, Starbucks, etc.),
wherein J, K, L, and M are positive integers.

System 210, in some embodiments of the present invention, uses one or more characteristics of a user's commercial exposure for generating the set of candidate venues, by basing the predetermined distance that is used to define "nearby" venues on the exposure.

Figure 7:
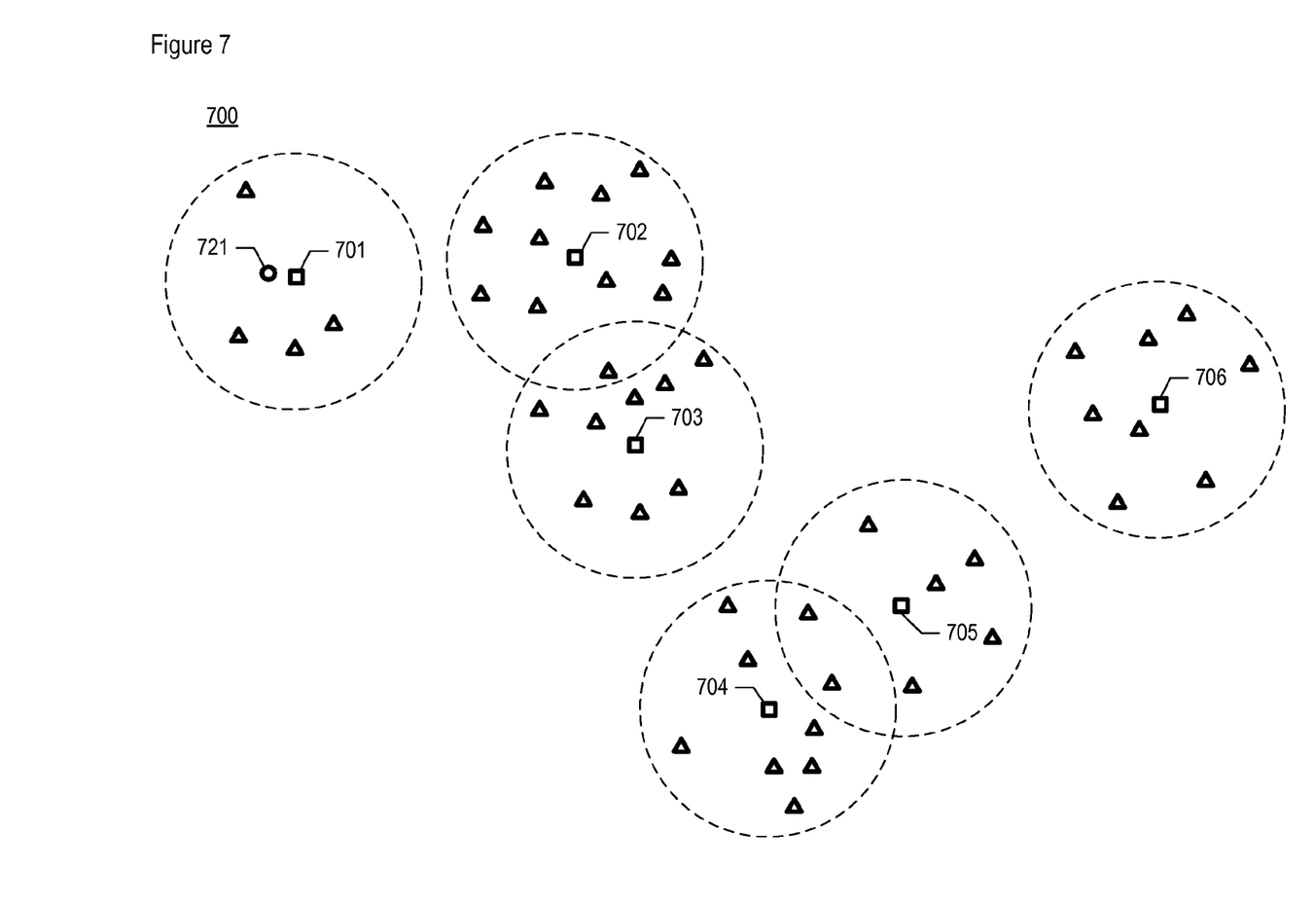
FIG. 7 depicts an example of determining candidate venues.

FIG. 7 depicts an example of how candidate venues are determined, in accordance with the illustrative embodiment of the present invention. Geographic area 700 is shown, throughout which users 701 through 706 are present. The users' current geolocations are represented by squares in the figure.

When a user's geolocation is made available, such as when user 701 checks in at venue 721, data-processing system 210 determines the candidate venues in relation to the geolocation of the user. As described above, system 210 identifies all candidate venues within the predetermined radius (e.g., user-specified, etc.) of the user, wherein the radius defines an area of proximity. The area of proximity associated with a user is depicted in the figure by a dashed circle, with the associated user at the center of the dashed circle and with the radius defining the area of proximity's radius, within which area are candidate venues identified by triangles.

In accordance with the illustrative embodiment, the set of candidate venues excludes all venues that the user has visited. In some alternative embodiments of the present invention, however, the set of candidate venues might in fact contain one or more venues that the user has visited.

Referring again to FIG. 6, at task 615 data-processing system 210 ranks candidate venues, resulting in a ranked set of venues. System 210 uses, as input data to the ranking process, the user identifier and the set of candidate venues for the user that was generated at task 610. In order to rank the candidate venues, system 210 applies the hypothesis learned at task 515 to the foregoing input data. Techniques for applying a hypothesis to data, in general, are well known in the art. As described above and with respect to task 515, in some embodiments of the present invention, the hypothesis incorporates a rule of preferring a visited venue (e.g., a checked-into venue, etc.) to a non-visited venue.

In accordance with the illustrative embodiment of the present invention, system 210 uses the calendrical time that corresponds to the user being at a geolocation, in the data received at task 605, in order to rank candidate venues in a time context. For example, it might be appropriate to rank higher or lower one or more categories of venues during lunchtime (e.g., rank sandwich shops and dry cleaners higher, rank dance clubs lower, etc.), whereas it would make sense to rank higher or lower a different set of categories late in the evening (e.g., rank singles bars and all-night diners higher, rank breakfast buffets and craft stores lower, etc.).

In some embodiments of the present invention, system 210 uses a user's prior commercial exposure to one or more commercial categories, in the ranking of candidate venues. For example and without limitation, in the ranking of candidate venues, system 210 can account for the commercial categories that are described above and with respect to task 610.

In some embodiments of the present invention, system 210 is able to use additional characteristics that are made available to system 210, in the ranking of candidate venues. For example and without limitation, system 210 is able to account for one or more characteristics (e.g., gender, birth date, commercial exposure, demographic exposure, etc.) of one or more users, in the data received at task 605. In any event, it will be clear to those skilled in the art, after reading this specification, how to make and use embodiments of the present invention, in which system 210 considers i) calendrical time, ii) one or more user characteristics, iii) one or more venue characteristics, or iv) other characteristics, in any combination, in the ranking of candidate venues. Furthermore, it will be clear to those skilled in the art, after reading this specification, how to make and use embodiments of the present invention, in which system 210 refrains from considering one or more of calendrical time, user characteristics, venue characteristics, and other characteristics, in the ranking of candidate venues.

At task 620, data-processing system 210 presents some or all of the ranked set of venues that was generated at task 615. In accordance with the illustrative embodiment, system 210 presents information in the ranked set to the user at the user's wireless terminal, such as wireless terminal 222, at which the information can be displayed. As those who are skilled in the art will appreciate, after reading this specification, system 210 can output, transmit, and/or present the information in some other way. For example and without limitation, system 210 can provide the ranked-set information to a different wireless terminal, a different type of device than a wireless terminal, or to a different user entirely, in some embodiments of the present invention.

In accordance with the illustrative embodiment of the present invention, out of all of the ranked-set information, system 210 presents only the highest-ranked candidate venue from the ranked set. Presenting only the highest-ranked candidate to the user is advantageous, for example, where there are space constraints on the display of the user's wireless terminal. Although there is only one venue presented to the user in the illustrative embodiment, it will be clear to those skilled in the art, after reading this specification, how to make alternative embodiments of the present invention in which system 210 presents any number of venues from the ranked set, such as and without limitation: i) the top N candidate venues in terms of ranking, wherein N is a positive integer; ii) all of the candidate venues in ranked order; or iii) some or all of the candidate venues in an ordering other than ranked, with or without additional information.

Figure 8:
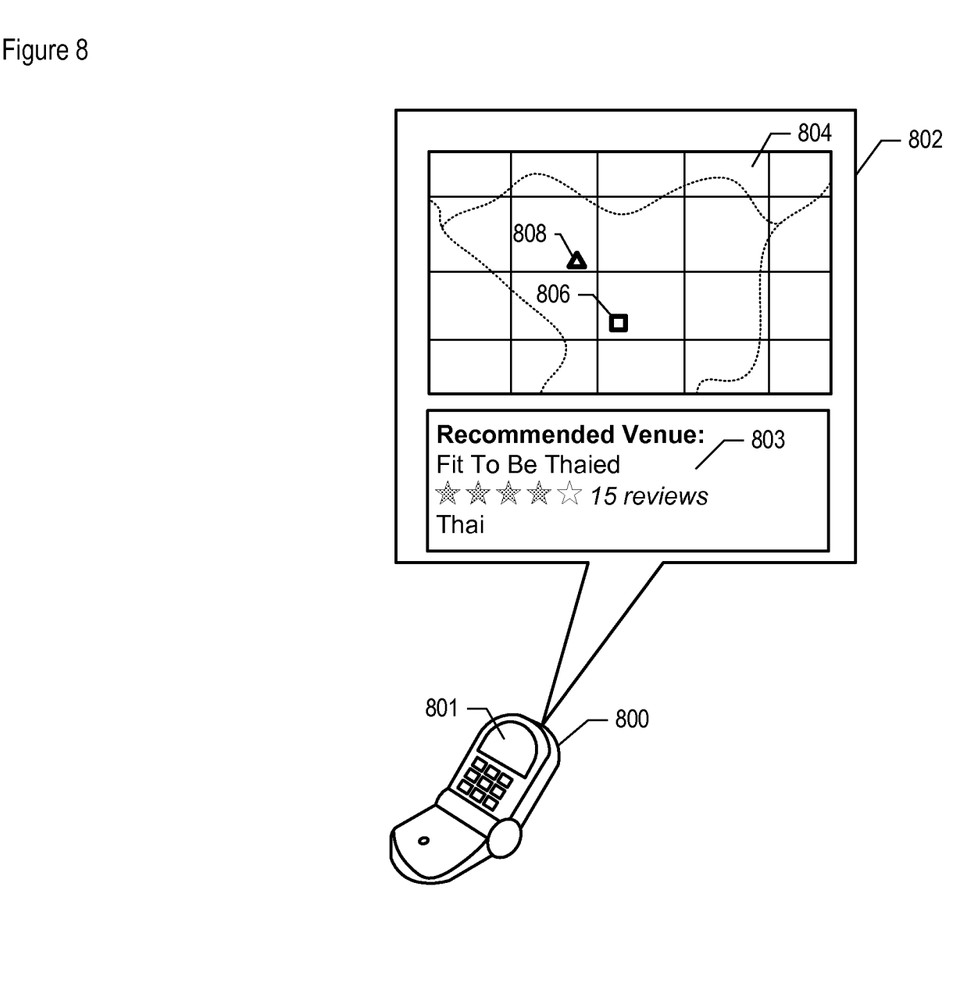
FIG. 8 depicts an example of presenting the candidate venue to a user.

FIG. 8 depicts an example of how the candidate venue is presented to a user, though wireless terminal 800, in accordance with the illustrative embodiment of the present invention. Terminal 800 is an example of wireless terminal 222 and comprises display 801, which is capable of presenting the information conveyed in venue display mode 802. Venue display mode 802 comprises candidate venue display 803 and map display 804.

The depicted information reflects a scenario in which the current geolocation of the user of terminal 800 is made known to data processing system 210. For example, the user might have opened up a location-related app on his smart phone, resulting in his location being assessed and made available. Upon receiving the geolocation of terminal 800, system 210 determines the candidate venues and ranks those venues, in accordance with the illustrative embodiment of the present invention. System 210 then presents the highest-ranked venue (labeled as "Recommended Venue"), named "Fit To Be Thaied," to user terminal 800, which displays this information as a suggested venue, as part of candidate venue display 803.

System 210 also presents additional information about the highest-ranked venue, such as rating information (four out of five stars indicated), number of reviews submitted ("15 reviews"), and type of venue ("Thai"), all of which are displayable as part of candidate venue display 803.

Additionally, terminal 800 displays map display 804, comprising the geolocation of the user, shown as user 806, in relation to the location of highest-ranked venue 808 (i.e., "Fit To Be Thaied"), all in relation to local geographic information (e.g., streets, buildings, boundaries, etc.) that is displayed in well-known fashion. Although only a single candidate venue (i.e., venue 808) is displayed on map display 804, system 210 can also provide additional candidate venues to terminal 800 for display.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products— that is, one or more modules of computer program instructions encoded on a computer-readable medium for execution by, or to control the operation of, a data-processing system. The computer-readable medium can be a machine-readable storage device, a machine-readable storage substrate, a memory device, or a combination of one or more of them. The term "data-processing system" encompasses all apparatus, devices, and machines for processing data, including by way of example a programmable processor, a computer, or multiple processors or computers. The data-processing system can include, in addition to hardware, code that creates an execution environment for the computer program in question, such as code that constitutes processor firmware, a protocol stack, a database management system, an operating system, or a combination of one or more of them.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   collecting, by a data-processing system, a geolocation, detected by a positioning device, of a user terminal of a first user;
   receiving, by the data-processing system, a calendrical time identifier comprising indicia indicating an instance in which the first user was at the detected geolocation;
   generating, by the data-processing system, a non-empty set of candidate venues based at least in part on the detected geolocation of the first user and the calendrical time identifier in response to the data-processing system determining that the candidate venues are within a predetermined distance of the detected geolocation of the first user;
   determining a set of venue categories based at least in part on the calendrical time identifier, wherein the calendrical time identifier indicates a time of day;
   including in the non-empty set of candidate venues and/or excluding from the non-empty set of candidate venues, one or more candidate venues based at least in part on the determined set of venue categories so that the non-empty set of candidate venues are determined by the data-processing system based in part on the time of day and the indicia indicating the instance in which the first user was at the detected geolocation indicated by the calendrical time identifier;
   ranking the candidate venues, by the data-processing system, based on applying, to the candidate venues, a hypothesis that is learned from locations, detected by the positioning device, of one or more venues visited by at least one of i) the first user and ii) one or more additional users, wherein the hypothesis incorporates a rule of preferring a visited venue to a non-visited venue;
   providing, by the data-processing system, visible indicia denoting one or more of the ranked candidate venues to a display device of the user terminal; and
   generating, by the data-processing system, an electronic map indicating a detected current geolocation of the user terminal of the first user in relation to a detected location of a highest ranked venue, denoted as a recommended venue to the first user, of the ranked candidate venues and providing the generated electronic map to the display device for display of the electronic map by the user terminal, the recommended venue is determined to be a venue previously visited by one of the one or more additional users, but which was not previously visited by the first user.

2. The method of claim 1 wherein an upper bound is applied to the rank of a matrix that represents the hypothesis.

3. The method of claim 1, wherein the ranking is also based on the calendrical time identifier.

4. The method of claim 1 further comprising receiving, by the data-processing system, an indication of commercial exposure of the first user, wherein the ranking is also based on the commercial exposure.

5. The method of claim 1, wherein the ranking is performed in a manner that excludes all venues visited by the first user and the rule is applied to venues visited by the one or more additional users.

6. The method of claim 1, wherein the predetermined distance comprises a predefined radius of an area of proximity around the geolocation of the first user.

7. A computer program product comprising at least one non-transitory computer-readable storage medium having computer-readable program code portions stored therein, the computer-readable program code portions comprising:
   an executable portion configured to collect a geolocation, detected by a positioning device, of a user terminal of a first user;
   an executable portion configured to receive a calendrical time identifier comprising indicia indicating an instance in which the first user was at the detected geolocation;
   an executable portion configured to generate a non-empty set of candidate venues based at least in part on the detected geolocation of the first user and the calendrical time identifier in response to determining that the candidate venues are within a predetermined distance of the detected geolocation of the first user;
   an executable portion configure to determine a set of venue categories based at least in part on the calendrical time identifier, wherein the calendrical time identifier indicates a time of day;
   an executable portion configured to include in the non-empty set of candidate venues and/or exclude from the non-empty set of candidate venues, one or more candidate venues based at least in part on the determined set of venue categories so that the non-empty set of candidate venues are determined based in part on the time of day and the indicia indicating the instance in which the first user was at the detected geolocation indicated by the calendrical time identifier;
   an executable portion configured to rank the candidate venues based on the received calendrical time identifier and on applying, to the candidate venues, a hypothesis that is learned from locations, detected by the positioning device, of one or more venues visited by at least one of i) the first user and ii) one or more additional users;
   an executable portion configured to provide visible indicia denoting one or more of the ranked candidate venues to a display device of the user terminal; and
   an executable portion configured to generate an electronic map indicating a detected current geolocation of the user terminal of the first user in relation to a detected location of a highest ranked venue, denoted as a recommended venue to the first user, of the ranked candidate venues and provide the generated electronic map to the display device for display of the electronic map by the user terminal, the recommended venue is determined to be a venue previously visited by one of the one or more additional users, but which was not previously visited by the first user.

8. The computer program product of claim 7 wherein an upper bound is applied to the rank of a matrix that represents the hypothesis.

9. The computer program product of claim 7 further comprising:
   an executable portion configured to receive an indication of commercial exposure of the first user, wherein the ranking is also based on the commercial exposure.

10. The computer program product of claim 9 wherein the indication identifies a commercial category.

11. The computer program product of claim 7, wherein the ranking is performed to exclude all venues visited by the first user and the hypothesis is learned from the locations of the one or more venues visited by the one or more additional users.

12. The computer program product of claim 7, wherein the hypothesis incorporates a rule of preferring a visited venue to a non-visited venue.

13. An apparatus comprising at least one processor and at least one memory including computer program code, the at least one memory and the computer program code configured to, with the processor, cause the apparatus to at least:
- collect a geolocation, detected by a positioning device, of a user terminal of a first user;
- receive a calendrical time identifier comprising indicia indicating an instance in which the first user was at the detected geolocation;
- generate a non-empty set of candidate venues based at least in part on the detected geolocation of the first user and the calendrical time identifier in response to determining that the candidate venues are within a predetermined distance of the detected geolocation of the first user;
- determine a set of venue categories based at least in part on the calendrical time identifier, wherein the calendrical time identifier indicates a time of day;
- include in the non-empty set of candidate venues and/or exclude from the non-empty set of candidate venues, one or more candidate venues based at least in part on the determined set of venue categories so that the non-empty set of candidate venues are determined based in part on the time of day and the indicia indicating the instance in which the first user was at the detected geolocation indicated by the calendrical time identifier;
- rank the candidate venues based on applying, to the candidate venues, a hypothesis that is learned from locations, detected by the positioning device, of one or more venues visited by at least one of i) the first user and ii) one or more additional users;
- provide visible indicia denoting one or more of the ranked candidate venues to a display device of the user terminal; and
- generate an electronic map indicating a detected current geolocation of the user terminal of the first user in relation to a detected location of a highest ranked venue, denoted as a recommended venue to the first user, of the ranked candidate venues and provide the generated electronic map to the display device for display of the electronic map by the user terminal, the recommended venue is determined to be a venue previously visited by one of the one or more additional users, but which was not previously visited by the first user.

14. The apparatus of claim 13, wherein the ranking is also based on the calendrical time identifier.

15. The apparatus of claim 13, wherein the computer program code are further configured to, with the processor, cause the apparatus to:
- receive an indication of commercial exposure of the first user, wherein the ranking is also based on the commercial exposure.

16. The apparatus of claim 13, wherein the memory and computer program code are further configured to, with the processor, cause the apparatus to:
- perform the ranking to exclude all venues visited by the first user and the hypothesis is learned from the locations of the one or more venues visited by the one or more additional users.

17. The apparatus of claim 13, wherein the hypothesis incorporates a rule of preferring a visited venue to a non-visited venue.

* * * * *

UNITED STATES PATENT AND TRADEMARK OFFICE
CERTIFICATE OF CORRECTION

PATENT NO. : 9,785,993 B2  
APPLICATION NO. : 13/668602  
DATED : October 10, 2017  
INVENTOR(S) : Cagatay Berk Kapicioglu et al.

Page 1 of 1

It is certified that error appears in the above-identified patent and that said Letters Patent is hereby corrected as shown below:

On the Title Page

Item (73) Line 1:
(73) Assignee: replace "Verge" with --Verve--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*